United States Patent
Jia et al.

(10) Patent No.: US 9,351,241 B2
(45) Date of Patent: May 24, 2016

(54) INDICATING A BUSY PERIOD IN A WIRELESS NETWORK

(71) Applicant: QUALCOMM Incorporated, San Diego, CA (US)

(72) Inventors: Zhanfeng Jia, Belmont, CA (US); Shu Du, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 14/041,209

(22) Filed: Sep. 30, 2013

(65) Prior Publication Data

US 2015/0092639 A1     Apr. 2, 2015

(51) Int. Cl.
| | |
|---|---|
| G08C 17/00 | (2006.01) |
| H04W 52/02 | (2009.01) |
| H04W 72/12 | (2009.01) |
| H04W 84/12 | (2009.01) |

(52) U.S. Cl.
CPC .......... *H04W 52/02* (2013.01); *H04W 52/0212* (2013.01); *H04W 72/1263* (2013.01); *H04W 84/12* (2013.01)

(58) Field of Classification Search
CPC ............ H04W 52/02; H04W 52/0212; H04W 72/1263; H04W 84/12
See application file for complete search history.

(56) References Cited

U.S. PATENT DOCUMENTS

| | | | | |
|---|---|---|---|---|
| 5,774,459 A | * | 6/1998 | Charrat | G06K 7/0008 370/310 |
| 6,198,722 B1 | * | 3/2001 | Bunch | H04L 12/413 370/229 |
| 6,320,354 B1 | * | 11/2001 | Sengupta | H01M 10/44 320/132 |
| 7,333,800 B1 | * | 2/2008 | Gopinath | H04W 48/02 370/338 |
| 7,454,173 B2 | | 11/2008 | Wiberg et al. | |
| 8,185,123 B2 | | 5/2012 | Shin | |
| 2004/0240426 A1 | * | 12/2004 | Wu | H04W 74/0816 370/350 |
| 2005/0226270 A1 | * | 10/2005 | Liu | H04W 74/0816 370/469 |
| 2006/0121854 A1 | * | 6/2006 | Abhishek | H04W 16/10 455/63.1 |
| 2006/0176908 A1 | * | 8/2006 | Kwon | H04W 8/26 370/473 |

(Continued)

FOREIGN PATENT DOCUMENTS

| | | |
|---|---|---|
| EP | 2632222 | 8/2013 |
| WO | 2011046703 | 4/2011 |
| WO | 2015048620 | 4/2015 |

OTHER PUBLICATIONS

"PCT Application No. PCT/US2014/057989 Invitation to Pay Additional Fees and Partial Search Report", Feb. 3, 2015, 7 pages.

(Continued)

*Primary Examiner* — Robert Wilson
(74) *Attorney, Agent, or Firm* — DeLizio Law, PLLC (57) ABSTRACT

An access point may transmit, to a first wireless device, a message indicating a busy period of the access point. The busy period is a time during which the access point will perform wireless operations with at least a second wireless device different from the first wireless device. During the busy period, the access point may refrain from transmitting from the access point to the first wireless device. The message indicating the busy period may include a duration of the busy period. The message indicating the busy period may be included in a portion of a data transmission to the first wireless device. The first wireless device may enter a low power mode (e.g., sleep operating state) responsive to the busy period.

33 Claims, 10 Drawing Sheets

(56) References Cited

U.S. PATENT DOCUMENTS

| | | | |
|---|---|---|---|
| 2006/0280134 A1* | 12/2006 | Kwon | H04L 29/06 370/278 |
| 2007/0037548 A1 | 2/2007 | Sammour et al. | |
| 2011/0075642 A1* | 3/2011 | Cordeiro | H04W 74/0816 370/338 |
| 2011/0128865 A1 | 6/2011 | Doppler et al. | |
| 2011/0158115 A1 | 6/2011 | Sun et al. | |
| 2011/0219097 A1* | 9/2011 | Crockett | G06F 15/16 709/219 |
| 2012/0028632 A1 | 2/2012 | Maeder et al. | |
| 2012/0120824 A1* | 5/2012 | Meylan | H04W 48/10 370/252 |
| 2013/0156049 A1* | 6/2013 | Calvarese | H04B 7/0604 370/474 |
| 2013/0308549 A1* | 11/2013 | Madan | H04W 28/26 370/329 |
| 2014/0095675 A1* | 4/2014 | Tomala | H04W 24/10 709/220 |
| 2015/0092639 A1* | 4/2015 | Jia | H04W 52/02 370/311 |

OTHER PUBLICATIONS

"PCT/US2014/057989 International Search Report", Mar. 20, 2015, 25 pages.

Manweiler, Justin, etal , Avoiding the Rush Hours: WiFi Energy Management via Traffic Isolation, http://www.cs.duke.edu/~jgm/files/manweiler11sleepwell.pdf, 14 pages, 2011.

"PCT Application No. PCT/US2014/057989 Written Opinion of the IPEA", Sep. 7, 2015, 11 pages.

* cited by examiner

INDICATING A BUSY PERIOD IN A WIRELESS NETWORK

BACKGROUND

Embodiments of the present disclosure generally relate to the field of communications, and, more particularly, to communications in a wireless network.

In wireless communication systems, a wireless device may include a transmitter and receiver for coupling to a wireless communications medium. The wireless device may consume power to operate a receiver even when the wireless device is not currently receiving a transmission. For some wireless devices, including battery-powered wireless devices, it is desirable to reduce power consumption as much as possible when the wireless device is not transmitting or receiving signals via the wireless communications medium.

Some wireless devices implement a power save mode or low power state to conserve power during idle periods. For example, in a power save mode, the wireless device may operate at a low power state for periods of time between beacon messages from an access point. The beacon messages from the access point may indicate to the wireless device that the wireless device should return to a normal power mode. Alternatively, a wireless device may alternate between a low power state and an active power state according to a fixed schedule configured by a network node. Configuration of the fixed schedule may cause unnecessary overhead if changed too frequently.

SUMMARY

In this disclosure, various embodiments are described in which an access point (or a wireless device acting as an access point (AP), such as a peer-to-peer wireless network Group Owner, "GO," Soft AP, etc.) may send a message indicating a foreseeable busy period of the access point. The busy period is a time during which the access point will perform wireless operations with at least a second wireless device different from the first wireless device.

In one embodiment, a message is transmitted to a first wireless device (e.g., by an AP), the message indicating a busy period during which the access point will perform wireless operations with at least a second wireless device different from the first wireless device. During the busy period, the access point may refrain from transmitting to the first wireless device. The message indicating the busy period may include a duration of the busy period. The message indicating the busy period may be included in a portion of a data transmission to the first wireless device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present disclosure. However, it is understood that the described embodiments may be practiced without these specific details. For instance, although examples refer to an access point indicating a busy period to a first wireless device, the techniques are applicable for use with peer-to-peer wireless communications or wireless mesh communications. Furthermore, while examples may refer to wireless local area network (WLAN) protocols such IEEE 802.11, and the like, the techniques herein may be used with other wireless or wired communications protocols. In other instances, well-known instruction instances, protocols, structures and techniques have not been shown in detail in order not to obfuscate the description.

In this disclosure, while the examples describe an access point performing various actions, the scope of the invention is not limited to an access point, as the methods and systems may comprise any device communicating with multiple devices, such as, but not limited to, a P2P-GO, Soft AP, a wireless device acting as an access point, a device using Wi-Fi Direct, or other devices known to one skilled in the art. In other embodiments, components integrated or coupled to an access point (or other wireless device) may perform the actions.

In some embodiments, an access point may communicate with a plurality of wireless devices, including at least a first wireless device and a second wireless device. In one embodiment, the access point may send a message to the first wireless device indicating a busy period of the access point during which the access point will perform wireless operations with at least a second wireless device. This disclosure includes several non-limiting example embodiments showing how the busy period may be determined. Furthermore, the present disclosure provides several non-limiting example embodiments showing how the busy period may be communicated to the first wireless device. In one embodiment, a message indicating a busy period may be included as part of a data transmission to the first wireless device, allowing for aperiodic determination and communication of busy periods. The first wireless device, upon receiving a message indicating a busy period of the access point, may have an opportunity to enter a low power state (e.g., deep sleep, or the like) during the busy period.

Figure 1:
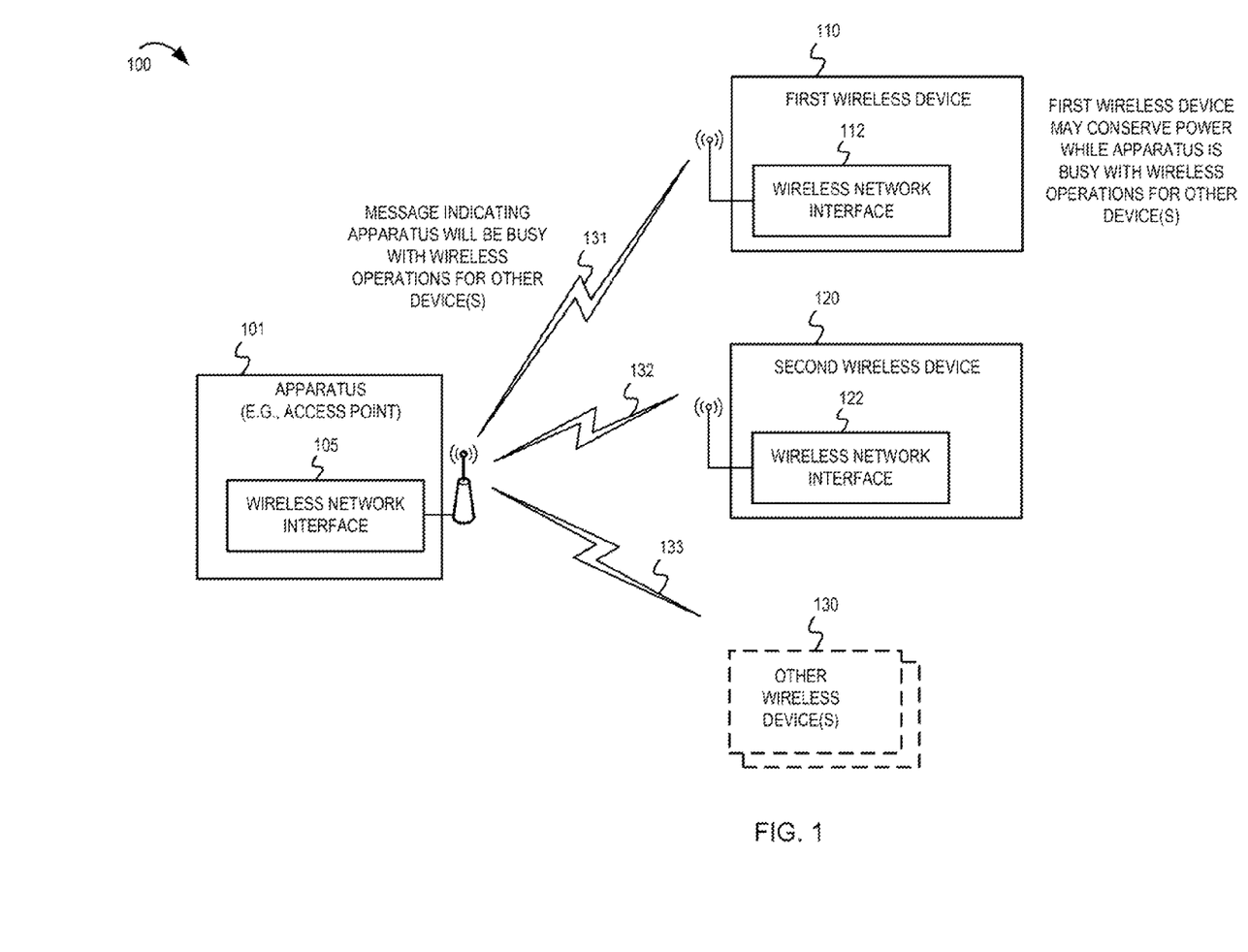
FIG. 1 depicts an example wireless network and introductory concepts in accordance with various embodiments of the present disclosure.

FIG. 1 depicts an example wireless network 100 and introductory concepts in accordance with the present disclosure. In a wireless network (such as wireless network 100), an apparatus 101 (e.g., an access point, AP) may be communicatively coupled to any number of wireless devices (often referred to as stations, or STA). The wireless network 100 may also be referred to as a wireless local area network (WLAN), but could also comprise other types of wireless networks in other embodiments (e.g., femtocells, picocells, etc.). The wireless network 100 may provide connectivity to a wide area network (WAN, not shown), such as the Internet or the like. Furthermore, wireless network 100 may provide connectivity to one or more other devices already associated to the wireless network 100. When a wireless device is introduced to the wireless network 100, the wireless device may "associate" (establish a wireless connection) with apparatus 101 to gain access via the wireless network 100 to other devices or services.

In the example wireless network 100, a first wireless device 110 is communicatively coupled (shown as wireless link 131) with the apparatus 101. Similarly, a second wireless device 120 is communicatively coupled (shown as wireless link 132) to the apparatus 101. Other wireless devices 130 may also have communications links 133 with the apparatus 101. To facilitate communications via a wireless communications media, each of the devices may have a wireless network interface 105, 112, 122. It should be understood that the apparatus 101 is also referred to as a wireless device in some descriptions because the apparatus 101 may be a wireless device acting as an AP. For example, in peer-to-peer communications and wireless mesh topologies, two or more wireless devices may communicate with each other, while one acts as the apparatus 101 and the other acts as a STA, such as first and second wireless devices 110, 120. For example, in WiFi Direct, one of the peer stations may act as a peer-to-peer wireless group owner (GO), which may be similar to apparatus 101 as described in this disclosure.

An apparatus 101 may control the use of the wireless communication medium to deliver downlink transmissions (e.g., from the apparatus 101 to the first wireless device 110) or to schedule uplink transmissions (e.g., from the first wireless device 110 to apparatus 101). When there are multiple wireless devices communicatively coupled to the apparatus 101, the apparatus 101 may provide queuing of data and scheduling of data transmissions to accommodate the multiple wireless devices 110, 120, 130. For example, the access point may limit the amount of time, referred to as a transmission opportunity (TX OP), during which a particular wireless device may transmit or receive data. In some communications networks, the apparatus 101 may use a round robin or prioritization scheme to determine the order in which the apparatus 101 will communicate with each of the multiple wireless devices 110, 120, 130. In other communications networks, the apparatus 101 may alter or vary the order according to configurations at the apparatus 101.

In accordance with several embodiments of this disclosure, the apparatus 101 may be capable of determining or estimating how long it will serve various wireless devices. For example, the apparatus 101 may use information regarding an amount of data queued for transmission to particular wireless devices, the order for communicating with the wireless devices, transmission rates, limits on transmission opportunity, or other data to determine how long the access point will be performing operations for particular wireless devices.

When an apparatus 101 is performing operations for wireless devices other than a first wireless device 110 (such as the second wireless device 120), the apparatus 101 is said to be busy performing wireless operations with other devices, different from the first wireless device 110.

While the term "busy" is used in the present examples, the term busy may simply mean that during the busy period for the first wireless device 110, the apparatus 101 will not communicate with the first wireless device 110 (e.g., the apparatus 101 is performing actions not relevant to the first wireless device 110). Other terms for busy could be used and may include active, unavailable, preoccupied, or other terms to indicate that the apparatus 101 is, e.g., concerned with other wireless devices, other than the first wireless device 110. During busy periods of the apparatus 101, the first wireless device 110 may be able to go into a low power state (e.g., deep sleep) if the first wireless device 110 knows about the busy period. In some embodiments, a low power state refers to an operating state to conserve power, and may include disabling radio elements, reducing a processor clocking speed, or cutting power to various radio components.

The apparatus 101 may generally be capable of determining an upcoming busy period (based on information available to the apparatus 101). Meanwhile, the first wireless device 110 may not be aware of the other wireless activities or pending tasks to be performed by the apparatus 101 that would cause a busy period.

In one embodiment of this disclosure, the apparatus 101 may transmit a message indicating a busy period during which the apparatus 101 will perform wireless operations with at least a second wireless device 120 different from the first wireless device 110. For example, an indicator regarding the busy period may be included as part of a data transmission to the first wireless device 110. In some embodiments, the indicator may include a duration (e.g., time value) of the busy period. The apparatus 101 may determine the duration of the busy period based, at least in part, on some or all of the amount of queued data for other wireless devices and indicate the duration of a next busy period on a per-transmission basis to the first wireless device 110.

The first wireless device 110 may receive the message indicating the busy period and may change an operating state during the busy period. For example, the first wireless device 110 may conserve power during the busy period while the apparatus 101 is busy with wireless operations associated with other wireless devices. Alternatively, the first wireless device 110 may perform a wireless network scan, or change to a different wireless channel with another device during the busy period.

Figure 2:
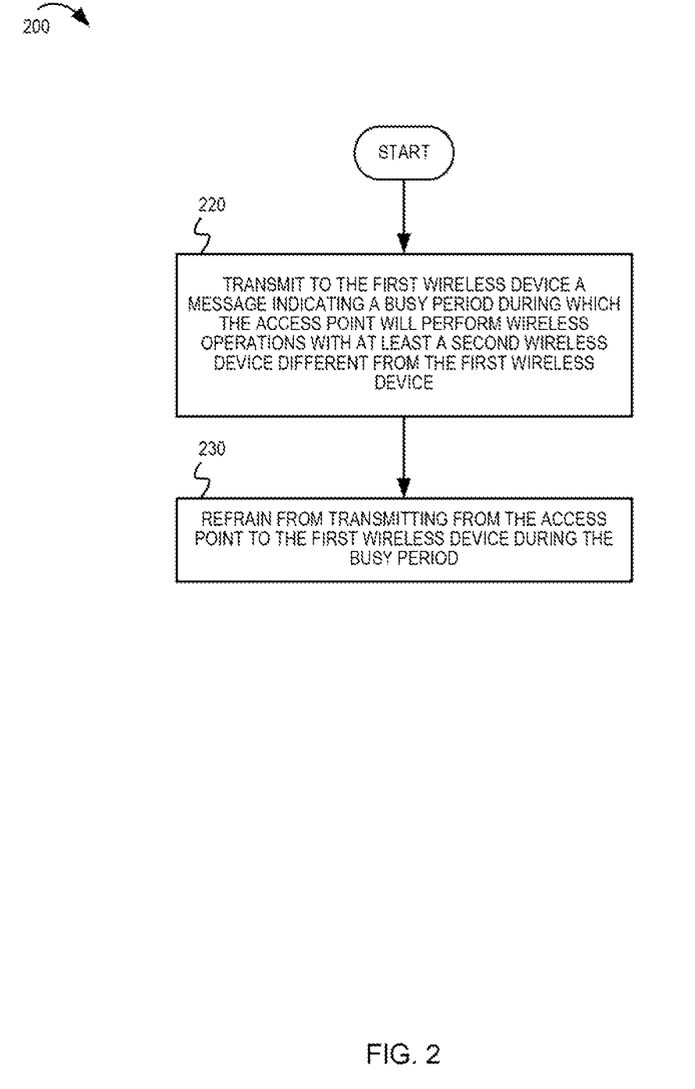
FIG. 2 is a flowchart illustrating example operations of an access point in accordance with at least one embodiment of the present disclosure.

FIG. 2 is a flowchart illustrating example operations 200 performed by an access point (such as apparatus 101) in accordance with at least one embodiment of the present disclosure. At 220, the access point may transmit, to the first wireless device, a message indicating a busy period during which the access point will perform wireless operations with at least a second wireless device different from the first wireless device. At 230, the access point may refrain from transmitting to the first wireless device during the busy period.

Figure 3:
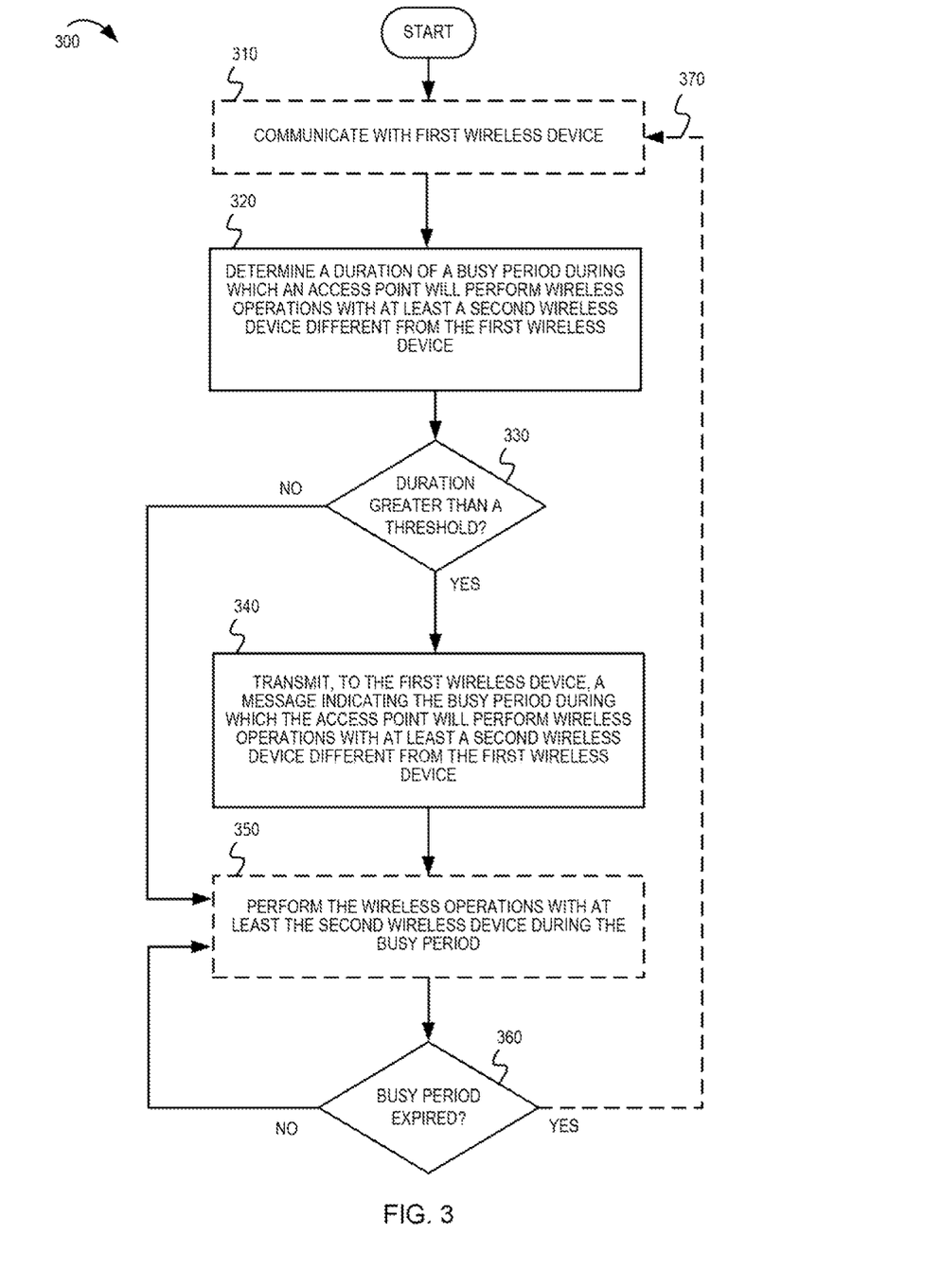
FIG. 3 is another flowchart illustrating example operations of an access point in accordance with at least one embodiment of the present disclosure.

FIG. 3 is another flowchart illustrating example operations 300 performed by an access point (such as apparatus 101) in accordance with at least one embodiment of the present disclosure.

At 310, the apparatus may communicate with a first wireless device. For example, the apparatus may have a TX OP available for the first wireless device to transmit upstream data. The apparatus may also communicate downstream data to the first wireless device.

At 320, the apparatus may determine a duration of a busy period during which the access point will perform wireless operations with at least a second wireless device different from the first wireless device. For example, the apparatus may examine the data queues at the apparatus for downstream data to be transmitted to the second wireless device. The apparatus may utilize predictive algorithms to estimate wireless activity with a plurality of wireless devices, or other wireless operations to be performed by the apparatus. In some embodiments, the duration of the busy period may be based, at least in part, on one or more of an amount of data queued at the access point for delivery to at least the second wireless device, a quantity of wireless devices communicatively coupled with the access point, queue depth, wireless device priority, or a transmission rate associated with the second wireless device with which the access point will communicate during the busy period.

At 330, the apparatus may determine if the duration of the busy period is greater than a threshold. If the duration is greater than the threshold, the flow chart continues to 340. If the duration is not greater than the threshold, the flow chart continues to 350. In one embodiment, the threshold may be associated with a time period for the first wireless device to transition to a low power state (e.g., the time period may be a minimum amount of time to stay in a power save mode to save sufficient power to offset any additional power required to enter and exit the power save mode). For example, the time period may be a minimum amount of time to stay in a power save mode to save sufficient power to offset any additional power required to enter and exit the power save mode, the amount of time needed for the first wireless device to transition to a low power state during the busy period, or a predetermined amount of time to justify the signaling overhead associated with indicating the busy period to the first wireless device.

At 340, the apparatus may transmit, to the first wireless device, a message indicating the busy period during which the access point will perform wireless operations with at least a second wireless device different from the first wireless device. The message may be a physical (PHY) layer protocol data unit (PPDU), a media access control (MAC) protocol data unit (MDPU), part of an aggregated MPDU (A-MPDU) frame, or a higher layer packet. In one embodiment, the message is included in an information element of a last MPDU of an A-MPDU frame transmitted to the first wireless device before the end of the TX OP.

At 350, the apparatus may perform wireless operations with at least the second wireless device during the busy period. Example wireless operations include communicating with other wireless devices (which may or may not use a different wireless protocol than the protocol used to communicate with the first wireless device), scanning wireless channels, communicating with another apparatus or an upstream wireless device.

At 360, the apparatus may determine whether the busy period has expired. Since, in some embodiments, the duration of the busy period is predicted based on expected wireless communications, it is possible that the apparatus may complete the expected wireless communications in a shorter duration than the determined duration. Since the first wireless device may enter a low power state during the indicated busy period (indicated by the determined duration), the apparatus will wait until the indicated busy period has expired before transmitting to the first wireless device again. If the busy period has not expired, the flow chart may return to block 350 so that the apparatus may perform other wireless operations during the indicated busy period. If the busy period has expired, the flow chart may return to block 310 so that the apparatus may communicate with the first wireless device.

It should be understood that while the apparatus may refrain from transmitting to the first wireless device during the indicated busy period, the first wireless device may not be prevented from transmitting to the apparatus. For example, first wireless device may determine not to enter the low power state during the indicated busy period. In some embodiments, the first wireless device may still perform wireless access contention and upstream communications with the apparatus during the indicated busy period. If the first wireless device does contend for access of the wireless communications channel, the apparatus may bypass block 360 and continue to block 310 to acknowledge the contention request and communicate with the first wireless device.

Figure 4:
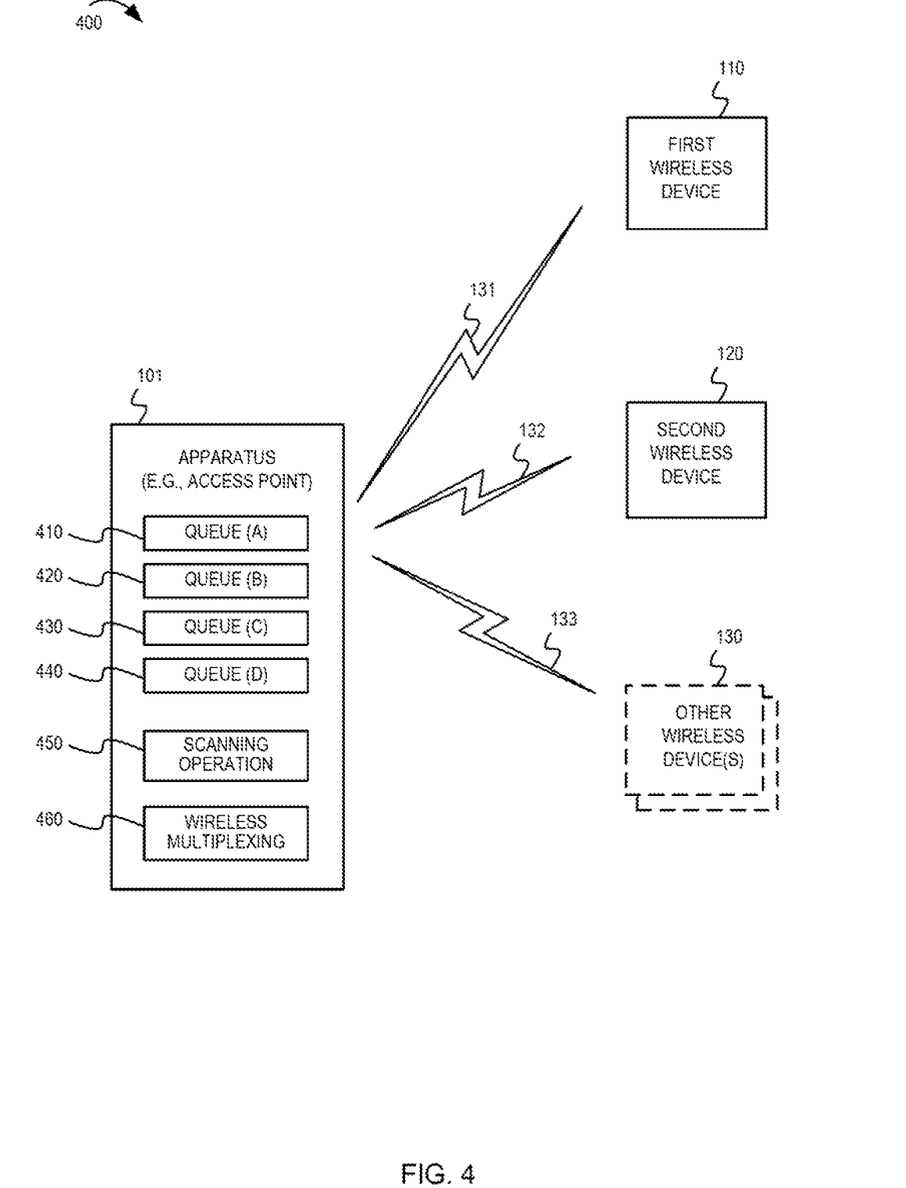
FIG. 4 is a diagram illustrating an access point determining a busy period in accordance with at least one embodiment of the present disclosure.

FIG. 4 is a diagram illustrating a wireless network 400 in which an apparatus 101 may determine a busy period in accordance with at least one embodiment of the present disclosure. The apparatus 101 is communicatively coupled (via wireless links 131, 132, 133, respectively) with a first wireless device 110, a second wireless device 120, and other wireless devices 130.

The apparatus 101 may have a plurality of data queues, such as queue A 410, queue B 420, queue C 430, queue D 440. The data queues may be associated with various wireless devices, or may be associated with priority queuing, or a combination thereof. For example, queue A 410 may be associated with first wireless device 110, and queue B 420 may be associated with second wireless device 120. Various queues may be associated with different priorities in accordance with the settings or configurations of the apparatus 101.

A further example of determining a busy period, especially if multiple queues exist, include if the apparatus 101 is configured to utilize round robin servicing of wireless devices 110, 120, 130, the busy period may be based, at least in part, on the number of other wireless devices associated with the apparatus 101. In some access points, the amount of time for each wireless device may be limited to a predetermined or maximum time period (e.g., the transmission opportunity, TX OP). However, not all wireless devices may utilize the full amount of time available. In some embodiments, the apparatus 101 may estimate the duration of the busy period to indicate to the first wireless device 110 based on recent uplink or downlink transmissions for each of the other wireless devices 120, 130. Alternatively, or additionally, the apparatus 101 may examine the queues 410-440 to determine an amount of downlink data queued at the apparatus 101 for transmission to the other wireless devices 120, 130 to determine the busy period to indicate to the first wireless device 110.

In some embodiments, a transmission to a particular wireless device may be limited by a predetermined or maximum time period. Additionally, a transmission to a particular wireless device may be limited by a protocol message size. As an example, a wireless protocol that uses aggregated media access control protocol data units (A-MPDUs) may be limited by the quantity of MPDUs that can be included in an A-MPDU transmission. Based on a data transmission limit and the amount of queued downlink data (e.g., in queues 410-440), the apparatus 101 may determine an estimated amount of time (busy period) that will be used to transmit the queued downlink data the second wireless device 120. Furthermore, the apparatus 101 may determine the amount of time that will be used to transmit to the second wireless device 120 based on information about a transmission rate for the second wireless device 120 or other characteristics of the wireless link 132 between the apparatus 101 and the second wireless device 120.

The apparatus 101 may also take into consideration various configurations or other logic used by the apparatus 101 to control communications via the wireless communications channel when determining a duration of a busy period to indicate to the first wireless device 110. For example, the access point may have configurations regarding scheduling (priority scheduler, round robin, various polling patterns, etc.) that control how the apparatus 101 will communicate with a plurality of wireless devices. The apparatus 101 may also have reserved periods of time during which the apparatus 101 keeps the communications channel idle to avoid interference with another communications system. For example, the apparatus 101 may have wireless multiplexing 460 operations. One example of wireless multiplexing 460 may include the apparatus 101 switching between a first wireless channel used to communicate with the first wireless device 110 and a second wireless channel used to communicate with another wireless device (or another AP). Another example of wireless multiplexing 460 may include the apparatus 101 using time division multiplexing to share a wireless communication channel with another device or AP.

The apparatus 101 may also periodically communicate on a different communications channel or perform a scanning operation 450. The scanning operation 450 may include detecting communications from another wireless device and/or communicating with the other wireless device. Based on an estimated time period for scanning operation(s) 450, the apparatus 101 may adjust the determined duration of the busy period to indicate to the first wireless device 110.

Taking into consideration a variety of information available to the apparatus 101, the apparatus 101 may determine a busy period during which the apparatus 101 will not transmit to the first wireless device due to the access point performing wireless operations with at least the second wireless device 120 and not the first wireless device 110. In many examples, the first wireless device 110 may not have access or knowledge of the information used by the apparatus 101 to determine the duration of the busy period. The apparatus 101 may include an indicator regarding the busy period such that the first wireless device 110 is made aware that the apparatus 101 will be busy with wireless operations unrelated to the first wireless device 110. The first wireless device 110 may decide whether to enter a low power state based on the busy period. Alternatively, the first wireless device 110 may decide to perform scanning of wireless channels, use a different wireless channel, or wireless operations not involving the apparatus 101, during the busy period indicated by the apparatus 101.

Figure 5:
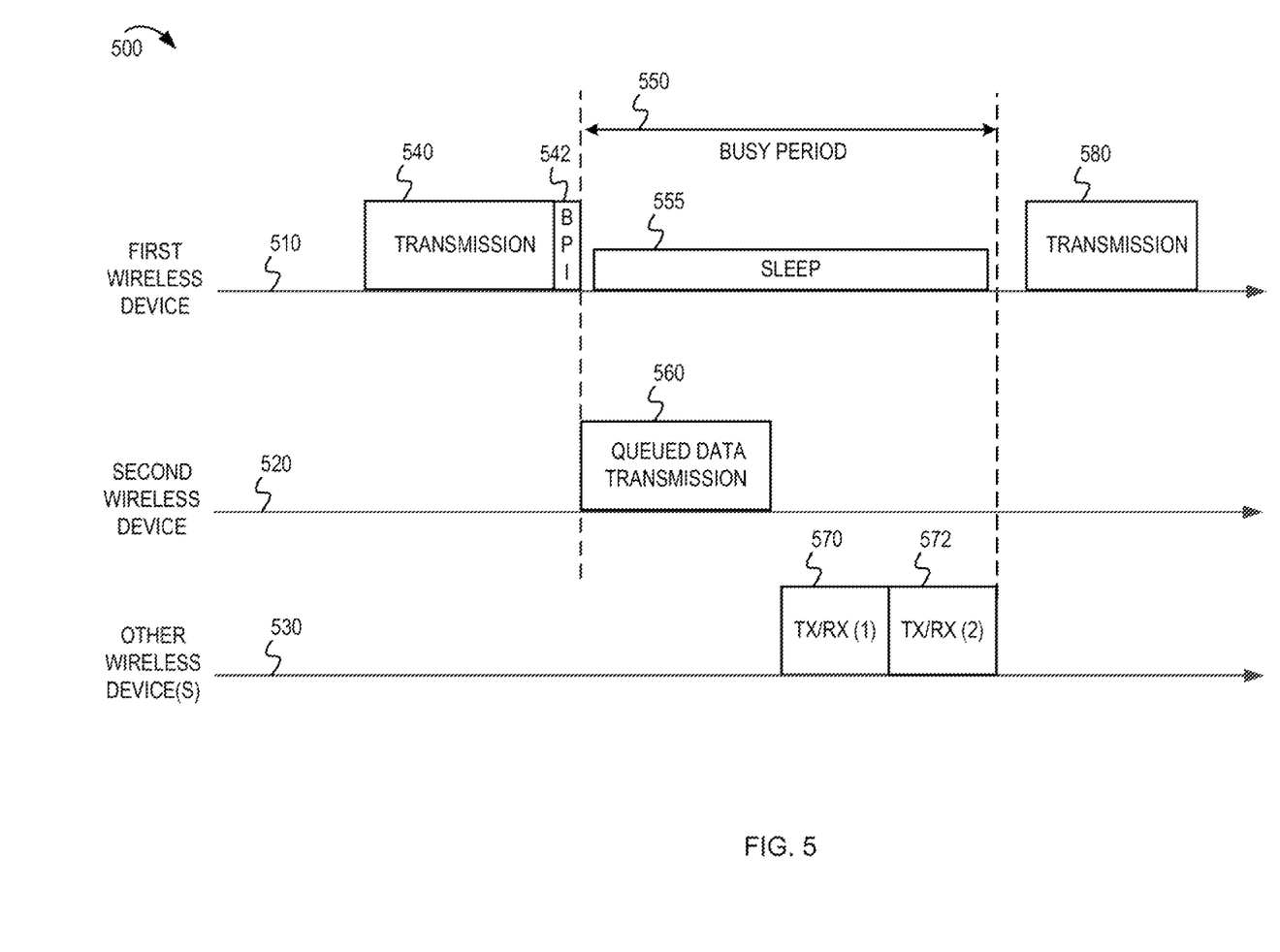
FIG. 5 is a timing diagram illustrating transmissions by an access point in accordance with at least one embodiment of the present disclosure.

FIG. 5 is a timing diagram 500 illustrating transmissions by an access point in accordance with at least one embodiment of the present disclosure. A first timeline 510 is associated with a first wireless device (such as first wireless device 110), a second timeline 520 is associated with a second wireless device (such as second wireless device 120), and a third timeline 530 is associated with other wireless devices (such as other wireless device(s) 130). Each of the timelines 510, 520, 530 are overlaid in time with each other, and represent activities that the access point (such as apparatus 101) may perform with regard to each of the first, second, and other wireless devices, respectively.

Moving through time from left to the right in the diagram, the access point may send a transmission 540 to the first wireless device. The transmission 540 may include or be appended with a busy period indicator 542. The access point may optionally include the busy period indicator 542 on a per-message basis (transmission 540).

Alternative to including a duration of the busy period, common or preconfigured durations may be known to the first wireless device and the access point so that the access point may include a short flag in the busy period indicator 542 to identify a specific common or preconfigured duration. The busy period indicator 542 informs the first wireless device regarding the busy period 550 that follows the busy period indicator 542. During the busy period 550, the first wireless device may enter a sleep mode 555 or low power state.

During the busy period 550, the access point may send queued data transmission 560 to the second wireless device, and may perform other transmissions (transmit or receive) TX/RX 570, 572 to the other wireless device(s).

After conclusion of the busy period 550, the access point may send a subsequent transmission 580 to the first wireless device. For example, another TX OP may be made available for either upstream or downstream data transmission. It should be understood that the subsequent transmission 580 may not occur exactly at the conclusion of the busy period 550, but may occur at some point after the conclusion of the busy period 550 as shown in FIG. 5. This may be, for example, due to variations in transmission times for TX/RX 570, 572, contention by other wireless devices, retransmissions, or the like.

Figure 6:
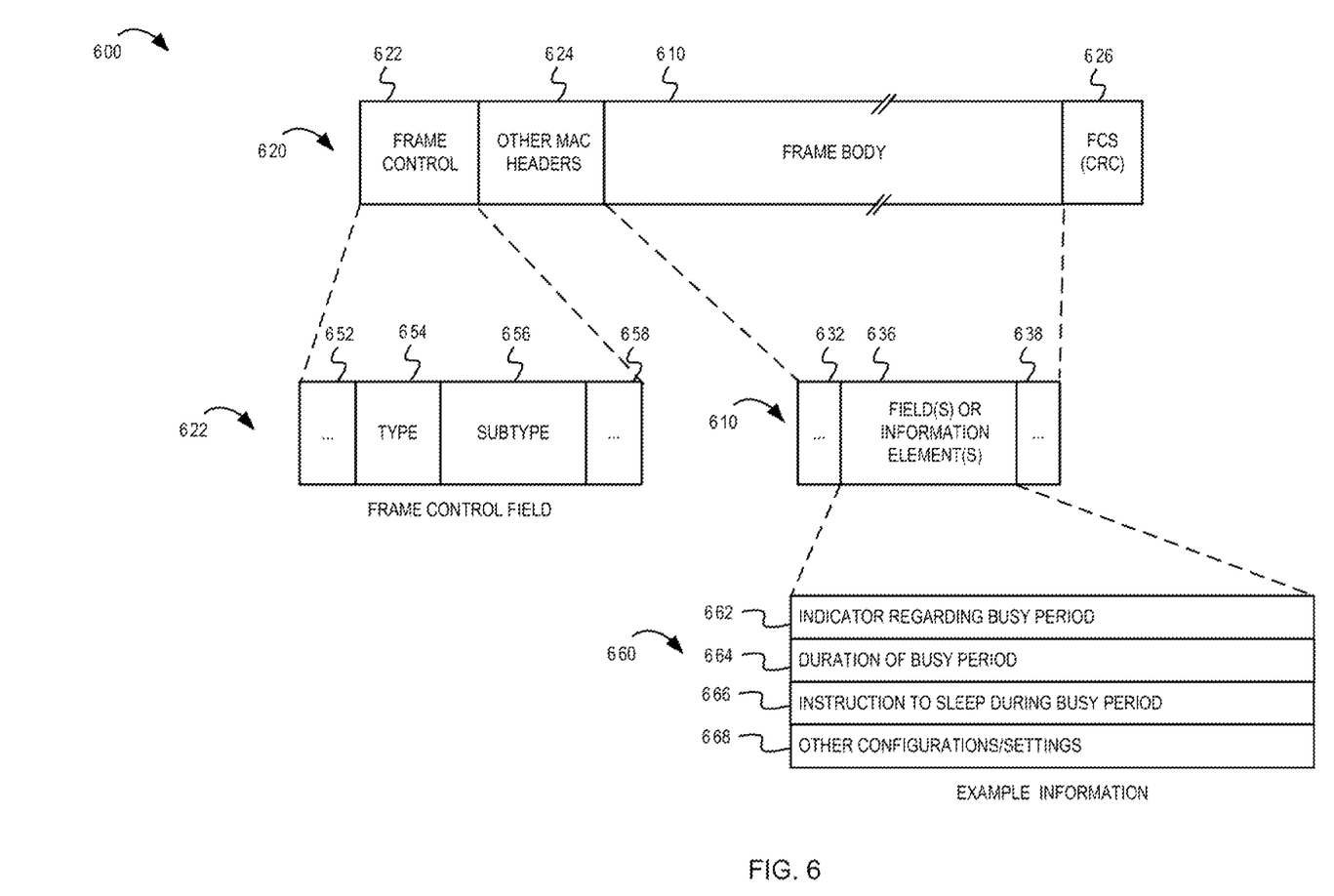
FIG. 6 is a diagram illustrating a message format in accordance with at least one embodiment of the present disclosure.

FIG. 6 is a diagram illustrating an example message format for communicating the busy period from the access point to the first wireless device. In one embodiment, the indicator regarding the busy period may be included in an information element (IE) portion of a MPDU. IE's may be used to include vendor-specific values while conforming to the wireless protocol specification. A wireless device that cannot interpret the IE may simply ignore the indicator. Otherwise, a wireless device that is capable of interpreting the IE as the indicator may benefit from the opportunity to enter a low power state or perform wireless operations during the busy period. In some embodiments, the message format may be a management frame.

The indicator may be relatively short to restrict the amount of overhead added by the indicator. For example, a relatively few number of bits may be used to communicate a time value from 0-100 ms, depending, e.g., on the resolution of time steps (e.g., a resolution of microseconds). Regardless of the resolution and range of the time value, a small amount of overhead may be used to include the indicator in a transmission from the access point to the wireless device.

In one implementation, the indicator may be a value to indicate that a busy period has been determined, but the indicator may not specify the duration of the busy period. For example, the access point and the wireless device may both be aware of a pre-configured, pre-negotiated, or default time period to associate with the indicator. The access point may specify a pre-configured duration in an overhead configuration message to the first wireless device. Whenever the indicator is included without a time value, the first wireless device may determine that the busy period will last for the pre-configured duration.

Turning to FIG. 6, a general message format 600 illustrates the use of an information element to convey information about a busy period accordance with various embodiments of the present disclosure. The message frame 620 may include a frame control field 622, other media access control (MAC) headers 624 (such as source address, destination address, etc.), a frame body 610, and a frame check sequence 626 (such as a CRC/checksum value). The frame control field 622 may include several miscellaneous headers or other values 652, 658. The frame control field 622 may also include a type field 654 and a subtype field 656. The type field 654 and subtype field 656 may be used to identify the type of frame. In accordance with one embodiment, a specific value combination of type and subtype may be used to indicate a frame having a busy period indicator. Alternatively, existing type and subtypes may be used and the busy period indicator may be included in the frame body 610 as part of fields or information elements 636.

The frame body 610 may include other miscellaneous fields or headers 632, 638. The protocol for wireless frames may allow for implementation-specific (or proprietary) fields or information elements 636. The information elements 636 may be used to include configurations, settings, or indicators associated with a busy period. Examples of frame information 660 may include zero, one, or different values. Examples of busy period information may include an indicator regarding a busy period (shown as 662), a duration of a busy period (shown as 664), an instruction for the first wireless device to sleep during the busy period (shown as 666), or other configurations/settings (shown as 668).

Figure 7:
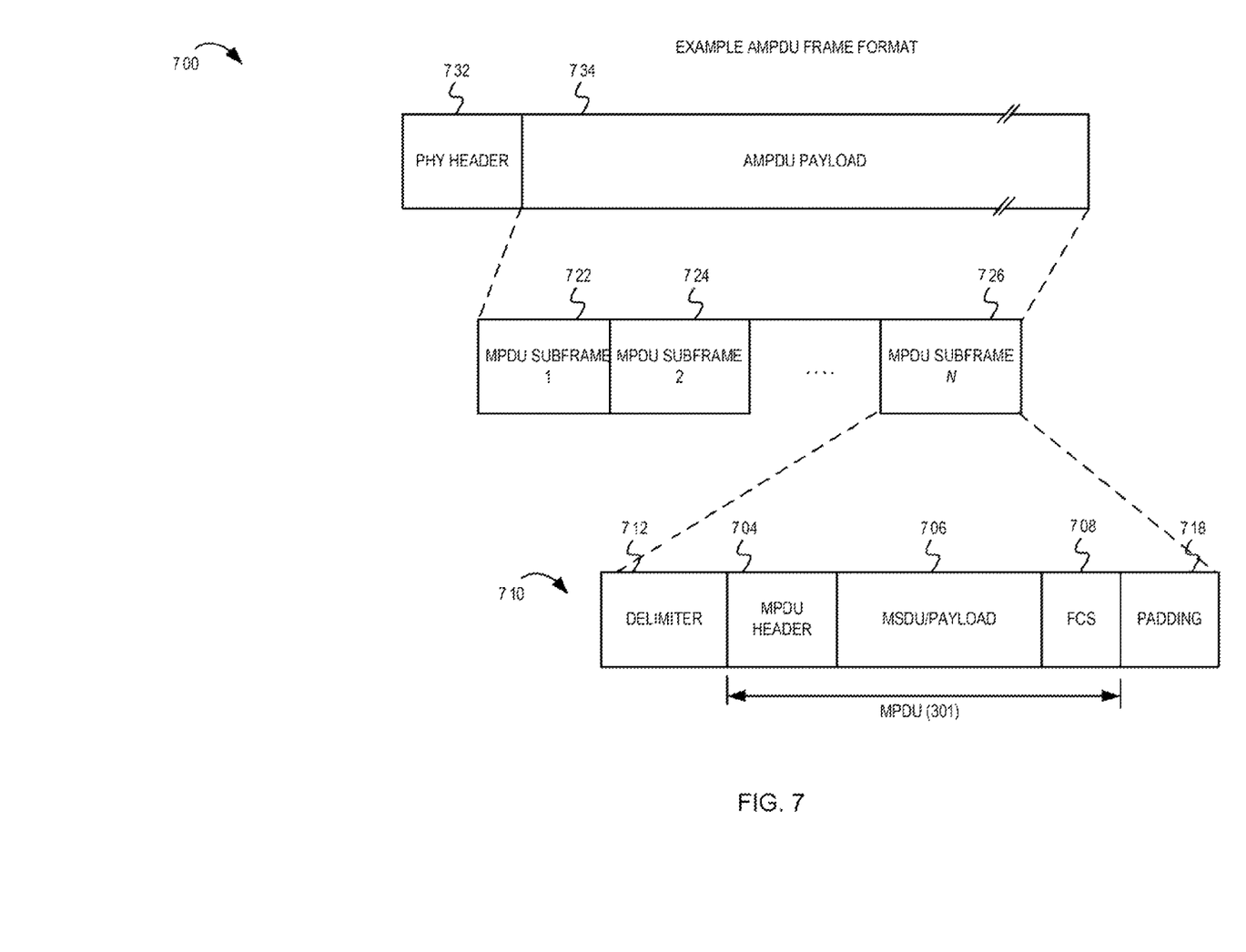
FIG. 7 is a diagram illustrating an aggregated media access control protocol data unit (AMDPU) message format in accordance with at least one embodiment of the present disclosure.

FIG. 7 is a diagram illustrating an aggregated media access control protocol data unit (AMPDU) frame format 700 in accordance with at least one embodiment of the present disclosure. The AMPDU frame format 700 may include a PHY header 732 portion and an AMPDU payload 734 portion. The AMPDU payload 734 includes a plurality of MPDUs. The MPDUs are structured as MPDU subframes (such as MPDU subframe "1" 722, MPDU subframe "2" 724, and MPDU subframe "N" 726) within the AMPDU payload 734.

Each MPDU subframe may have a structure similar to example MPDU subframe 710. The example MPDU subframe 710 includes a delimiter field 712, an MPDU 701, and padding 718. The MPDU 701 may comprise an MPDU header 704, a payload 706, and a frame check sequence (FCS) field 708. Typically the payload 706 of the MPDU may include a MAC service data unit (MSDU).

It should be understood that the quantity of MPDU subframes included in the AMPDU frame may be variable. In accordance with some WLAN standards, the quantity of MPDU subframes may be limited to a maximum of 64 units. Furthermore, the quantity of MPDU subframes may be selectable from fixed predetermined quantities (e.g., 1, 2, 4, 8, 16, 32, or 64).

The indicator regarding the busy period may be included in an MPDU as part of an A-MPDU transmission to the first wireless device. For example, the access point may add a management MPDU to an aggregation of MPDUs already prepared for the first wireless device. In some implementations, the management MPDU may be included as the last MPDU of the A-MPDU. Alternatively, the indicator may be included as a delimiter between MPDUs or after the last MPDU of the A-MPDU transmission. Alternatively, the indicator may be included as an action frame or other transmission of dedicated purpose. In other examples, the indicator may be included as a field in a physical layer (PHY) protocol data unit (PPDU) or a higher layer protocol packet.

It should be understood that the examples in FIGS. 6-7 are non-limiting examples. One skilled in the art will be able to recognize variations to the examples that do not expand past the scope of the invention.

Figure 8A:
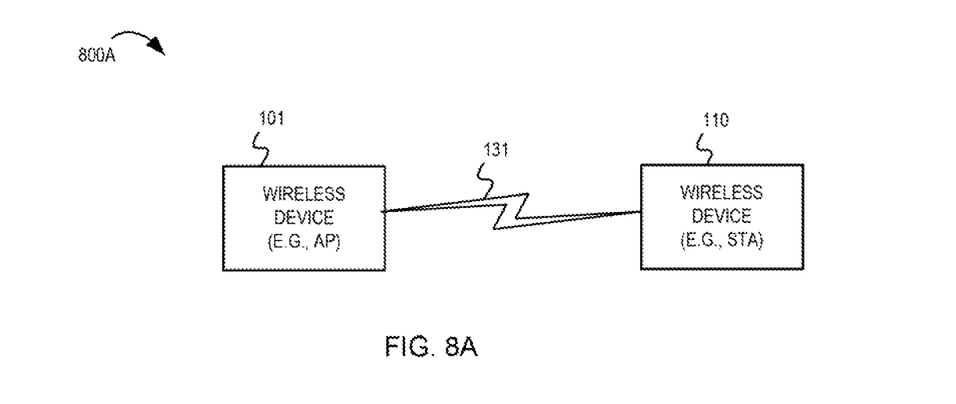
FIGS. 8A-8B are further example system diagrams illustration various alternative topologies in accordance with at least one embodiment of the present disclosure.
Figure 8B:
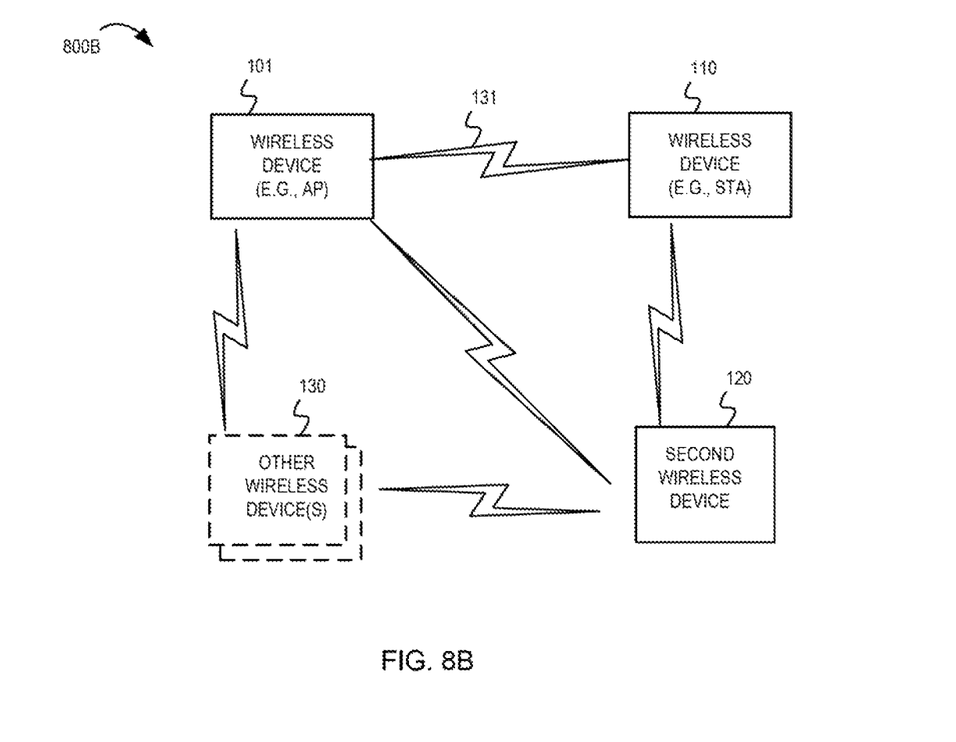

FIGS. 8A-8B are further example system diagrams illustration various alternative topologies in accordance with at least one embodiment of the present. The access point in the above examples may be any type of device, including an access point apparatus or a wireless device. For example, in some WLAN topologies, such as Wi-Fi Direct, Wireless mesh, peer-to-peer wireless, or the like, a wireless device may behave as an access point for one or more other wireless devices. The above examples are not limited to the access point, but also extend to a wireless device that provides an AP feature to the first wireless device.

In FIG. 8A, the apparatus 101 is a wireless device with a peer-to-peer wireless link (shown as wireless link 131) with the first wireless device 110 acting as a STA in the peer-to-peer session. In FIG. 8B, the apparatus 101 is a wireless device that is participating in a wireless mesh topology with the first wireless device 110, second wireless device 120, and other wireless device(s) 130.

Figure 9:
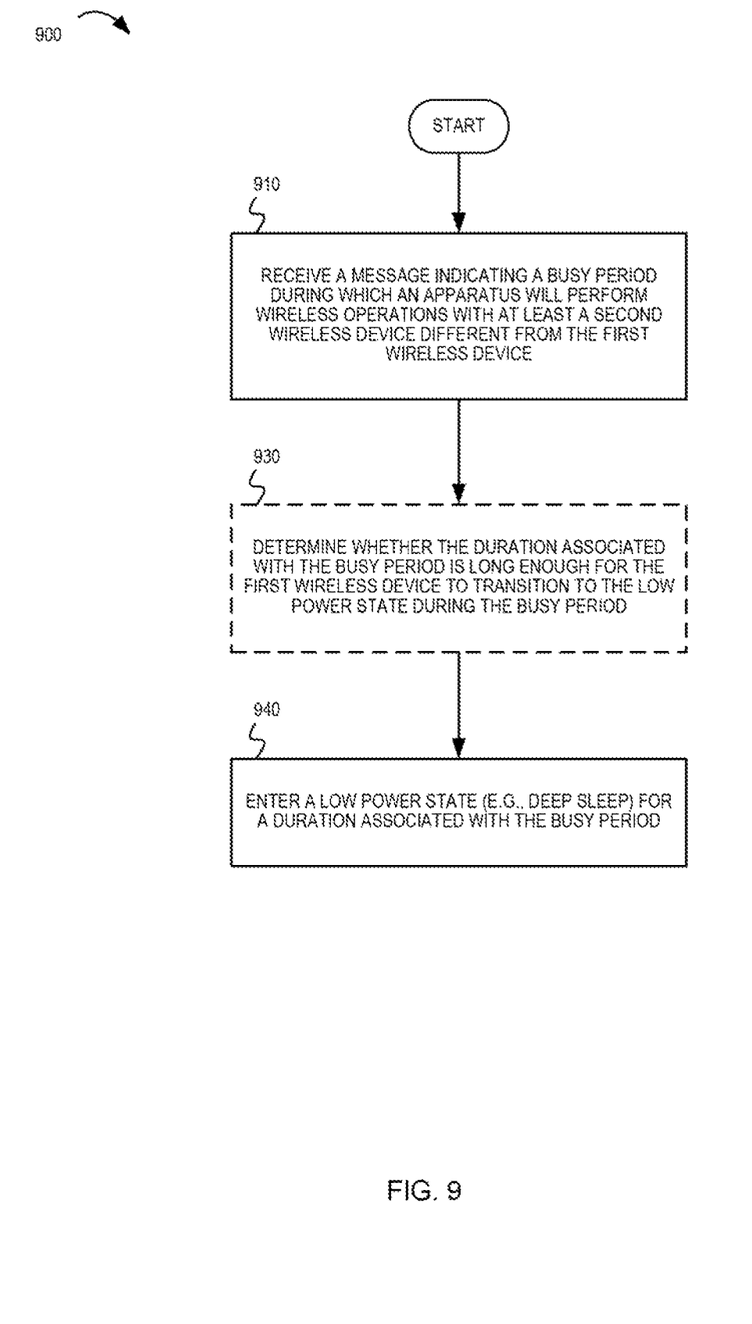
FIG. 9 is another flowchart illustrating example operations of a wireless device in accordance with at least one embodiment of the present disclosure.

FIG. 9 is another flowchart 900 illustrating example operations of a first wireless device in accordance with at least one embodiment of the present disclosure. At 910, the first wireless device may receive, from an access point, a message indicating a busy period during which the access point will perform wireless operations with at least a second wireless device different from the first wireless device. At 920, the first wireless device may determine whether the duration associated with the busy period is long enough for the first wireless device to transition to the low power state during the busy period. At 930, the first wireless device may enter a low power state (e.g., deep sleep) for a duration associated with the busy period.

It should be understood that FIGS. 1-9 and the operations described herein are examples meant to aid in understanding embodiments and should not be used to limit embodiments or limit scope of the claims. Embodiments may perform additional operations, fewer operations, operations in parallel or in a different order, and some operations differently.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present disclosure may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
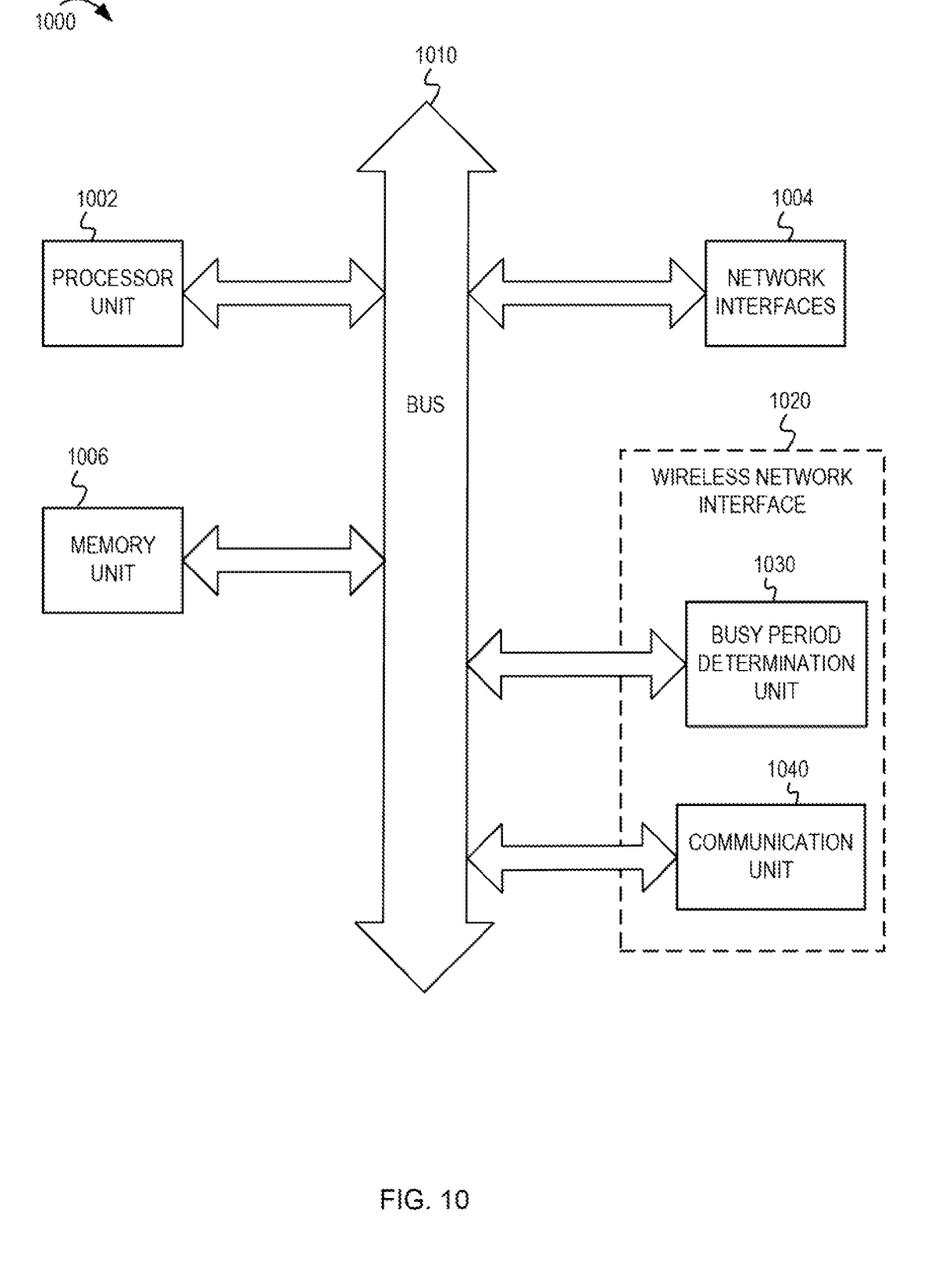
FIG. 10 is a block diagram illustrating an electronic device suitable to implement at least one embodiment of the present disclosure.

FIG. 10 is an example block diagram of one embodiment of an electronic device 1000 (e.g. an access point, such as apparatus 101 or a first wireless device, such as first wireless device 110) capable of implementing various embodiments of this disclosure. In some implementations, the electronic device 1000 may be an electronic device such as a laptop computer, a tablet computer, a mobile phone, a powerline communication device, a gaming console, or other electronic systems comprising functionality to implement wireless communication in accordance with this disclosure. The electronic device 1000 may include functionality to communicate across multiple communication networks (which form a hybrid communication network). The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 also includes a bus 1010 (e.g., PCI, ISA, PCI-Express, HyperTransport®, InfiniBand®, NuBus, AHB, AXI, etc.), and network interfaces 1004 that include at least a wireless network interface (e.g., a WLAN interface, a BLUETOOTH® interface, a WiMAX interface, a ZigBee® interface, a Wireless USB interface, etc.) and may additionally include a wired network interface (e.g., a powerline communication interface, an Ethernet interface, etc.).

The electronic device 1000 may also include a busy period determination unit 1030 and a communication unit 1040. The busy period determination unit 1030 and communication unit 1040 may be part of a wireless network interface 1020. The busy period determination unit 1030 may include functionality to determine a busy period in accordance with various embodiments of this disclosure. The busy period determination unit 1030 may also include functionality to determine a duration of the busy period. The communication unit 1040 may include functionality to transmit a message indicating the busy period to the first wireless device.

Alternatively, the electronic device 1000 may behave as the first wireless device. The communication unit 1040 may include functionality to receive a message indicating a busy period. The busy period determination unit 1030 may include functionality to interpret the message and cause the electronic device 1000 to change an operating state (such as entering a low power mode) responsive to the busy period.

Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, the memory unit 1006, and the network interfaces 1004 are coupled to the bus 1010. Although illustrated as being coupled to the bus 1010, the memory unit 1006 may be coupled to the processor unit 1002.

While the embodiments are described with reference to various implementations and exploitations, it will be understood that these embodiments are illustrative and that the scope of the present disclosure is not limited to them. In general, techniques for determining a busy period and transmitting a message indicating the busy period as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method performed by an access point of a wireless network, the method comprising:
   determining, at the access point, a duration of a busy period during which the access point will perform wireless operations with at least a second wireless device and not a first wireless device;
   transmitting, from the access point to the first wireless device, a message indicating the busy period; and
   refraining from transmitting from the access point to the first wireless device during the busy period.

2. The method of claim 1, further comprising:
   performing the wireless operations with at least the second wireless device during the busy period.

3. The method of claim 1, wherein the wireless operations include the access point communicating with a plurality of other wireless devices different from the first wireless device.

4. The method of claim 1, wherein the wireless operations include the access point switching to a different wireless channel.

5. The method of claim 1,
   wherein transmitting the message comprises transmitting the message in response to a determination that the duration of the busy period is greater than a threshold.

6. The method of claim 1, wherein determining the duration of the busy period comprises at least one member of the group consisting of:
   determining the duration of the busy period based, at least in part, on an amount of data queued at the access point for delivery to at least the second wireless device; and
   estimating the duration of the busy period based, at least in part, on a quantity of wireless devices communicatively coupled with the access point.

7. The method of claim 1, wherein the duration of the busy period is based on at least one member of the group consisting of a queue depth, a wireless device priority, and a transmission rate associated with the second wireless device with which the access point will communicate during the busy period.

8. The method of claim 1, wherein the message is at least one member of the group consisting of an action frame, a management frame, a delimiter, and an information element.

9. The method of claim 1, wherein the message comprises a media access protocol data unit (MPDU) having an indicator regarding the busy period included in an information element (IE) of the MPDU.

10. The method of claim 9, wherein the MPDU is included in an aggregated media access protocol data unit (A-MPDU) sent to the first wireless device.

11. The method of claim 9, wherein the MPDU having the indicator regarding the busy period is included as a last MPDU of the A-MPDU.

12. The method of claim 1, wherein the message comprises a portion of a physical layer (PHY) protocol data unit (PPDU).

13. The method of claim 1, wherein the message includes a value representing the duration associated with the busy period.

14. The method of claim 1, wherein the message comprises an indicator recognizable by the first wireless device to indicate the busy period.

15. The method of claim 1, wherein the wireless operations include the access point scanning wireless channels.

16. The method of claim 1, further comprising:
   determining whether to send the message indicating the busy period based, at least in part, on whether the duration of the busy period is long enough for the first wireless device to transition to a low power state during the busy period.

17. The method of claim 1, wherein the access point and the first wireless device are peer-to-peer wireless devices.

18. The method of claim 1, wherein the access point and the first wireless device are wireless mesh devices.

19. An access point of a wireless network, the access point comprising:
   a processor; and
   memory having instructions stored therein which, when executed by the processor, cause the access point to:
      determine a duration of a busy period during which the access point will perform wireless operations with at least a second wireless device and not a first wireless device;
      transmit, to the first wireless device, a message indicating the busy period; and
      refrain from transmitting from the access point to the first wireless device during the busy period.

20. The access point of claim 19, wherein the instructions, when executed by the processor, cause the access point to perform the wireless operations with at least the second wireless device during the busy period.

21. The access point of claim 20, wherein the wireless operations include the access point communicating with a plurality of other wireless devices different from the first wireless device.

22. The access point of claim 20, wherein the wireless operations include the access point switching to a different wireless channel.

23. The access point of claim 19, wherein instructions, when executed by the processor, cause the access point to transmit the message indicating the busy period in response to a determination that the duration of the busy period is greater than a threshold.

24. The access point of claim 23, wherein the instructions comprise at least one member of the group consisting of:
   instructions which, when executed by the processor, cause the access point to determine the duration of the busy period based, at least in part, on an amount of data queued at the access point for delivery to at least the second wireless device; and
   instructions which, when executed by the processor, cause the access point to determine the duration of the busy period based, at least in part, on a quantity of wireless devices communicatively coupled with the access point.

25. The access point of claim 19, wherein the duration of the busy period is based on at least one member of the group consisting of queue depth, wireless device priority, or transmission rate associated with the second wireless device with which the access point will communicate during the busy period.

26. A non-transitory computer readable medium storing instructions which, when executed by a processor of an access point, cause the access point to:
   determine, at the access point, a duration of a busy period during which the access point will perform wireless operations with at least a second wireless device and not a first wireless device;
   transmit, from the access point to the first wireless device, a message indicating the busy period; and
   refrain from transmitting from the access point to the first wireless device during the busy period.

27. The non-transitory computer readable medium of claim 26, wherein the instructions, when executed by the processor, cause the access point to:
  transmit the message indicating the busy period in response to a determination that the duration of the busy period is greater than a threshold.

28. The non-transitory computer readable medium of claim 26, wherein the instructions, when executed by the processor, further cause the access point to:
  determine the duration of the busy period based, at least in part, on at least one from the group consisting of:
    an amount of data queued at the access point for delivery to at least the second wireless device; and
    a quantity of wireless devices coupled with the access point.

29. The non-transitory computer readable medium of claim 26, wherein the duration of the busy period is based on at least one member of the group consisting of queue depth, wireless device priority, or transmission rate associated with the second wireless device with which the access point will communicate during the busy period.

30. A method performed by a first wireless device, the method comprising:
  receiving, from an access point, a message indicating a duration associated with a busy period during which the access point will perform wireless operations with at least a second wireless device different from the first wireless device; and
  operating the first wireless device in a low power state for the duration associated with the busy period.

31. The method of claim 30, further comprising:
  determining whether the duration associated with the busy period is long enough for the first wireless device to transition to the low power state during the busy period.

32. A first wireless device for use in a wireless network, the first wireless device comprising:
  a processor; and
  memory having instructions stored therein which, when executed by the processor, cause the first wireless device to:
    receive, from an access point, a message indicating a duration associated with a busy period during which the access point will perform wireless operations with at least a second wireless device different from the first wireless device; and
    operate the first wireless device in a low power state for the duration associated with the busy period.

33. The first wireless device of claim 32, wherein the instructions, when executed by the processor, cause the first wireless device to determine whether the duration associated with the busy period is long enough for the first wireless device to transition to the low power state during the busy period.

* * * * *